United States Patent [19]
Turner

[11] 3,784,014
[45] Jan. 8, 1974

[54] WASTE AND WATER TREATMENT SYSTEM

[75] Inventor: Abner B. Turner, Greensburg, Pa.

[73] Assignee: Westinghouse Electric Corporation, Pittsburgh, Pa.

[22] Filed: July 1, 1971

[21] Appl. No.: 158,852

Related U.S. Application Data
[63] Continuation-in-part of Ser. No. 80,985, Oct. 15, 1970, Pat. No. 3,716,159.

[52] U.S. Cl. .................................. 210/263, 210/503
[51] Int. Cl. .............................................. B01d 17/06
[58] Field of Search ................. 210/24, 27, 36, 263, 210/501–503

[56] References Cited
UNITED STATES PATENTS

| | | | |
|---|---|---|---|
| 3,382,983 | 5/1968 | Stewart | 210/503 X |
| 2,464,204 | 3/1949 | Baker | 210/36 |
| 2,701,792 | 2/1955 | Owen | 210/36 |
| 2,367,384 | 1/1945 | Trmstda et al | 210/36 |

Primary Examiner—John Adee
Attorney—A. T. Stratton et al.

[57] ABSTRACT

A device for the separation of particulate matter including colloidal particles from a liquid medium consisting of a conveyer belt composed of tightly coiled springs, a dry chemical feed system, a surge conditioning tank, an incinerator and a plurality of filtration columns. The columns include a bimetallic medium which separates particles electrophoretically, for example electrically conductive metallic alluminum powder and electrically conductive carbon granules.

3 Claims, 2 Drawing Figures

PATENTED JAN 8 1974  3,784,014

WASTE AND WATER TREATMENT SYSTEM

CROSS-REFERENCE TO RELATED APPLICATION

This application is a continuation-in-part of copending application Ser. No. 080,985, filed Oct. 15, 1970 now U.S. Pat. No. 3,716,139.

BACKGROUND OF THE INVENTION

This invention pertains to water and waste water treatment systems and more particularly to such systems which produce a high quality effluent by utilizing filtration columns.

Recently enacted water quality legislation has created the need for a water and waste water treatment system capable of operating in limited space and treating water or waste or a high quality.

Many of the water and waste water treatment plants which are capable of treating waste or water to a high quality rely on filters to provide removal of fine particles. Such removal usually follows the steps of coagulation and clarification, by settling or otherwise. Accordingly, the quality of the effluent from the usual waste treatment or water treatment plant is primarily dependent upon the polishing action of the filtration columns.

The best known of the present filtering columns is the sand filter, i.e., a filter consisting of a bed of sand from 24 to 30 inches thick. As small particles move through the pores formed between adjacent sand particles, they come in contact with the surfaces of the particles and adhere thereto. The process is aided by the curved flow path which the particles must take to flow through the layers of sand. Centrifugal forces are formed thereby which throw the particles against the sand grain surfaces. The suspended particles within the pores are also in close contact and flocculate, especially at constructions. The flocculation aids adhesion and establishes a straining action through the accumulated material.

Recently small aluminum particles for example, in the range from 30 to 50 mesh, which resemble sand, have been used to replace sand in filters with good results. The aluminum bearing granules are thought to generate permanent electrical charges. These charges attract turbidity particles and cause these particles to adhere to the surface of the aluminum granules.

SUMMARY OF THE INVENTION

A minimum size, maximum effluent quality treatment apparatus is obtained in accordance with this invention by sizing the surge conditioning for minimum volume and the filtration system for maximum flow and performance. The filtration-absorption system includes at least one column of a bimetallic media. The particles of filter media having differing electrode potentials produce a galvanic cell and attracts ionized particles in the throughput solution.

Several columns may make up the filtration system. In one example, the media in the first column is 20 to 50 mesh aluminum powder. This filter medium performs a dual function. First, it removes the conditioned suspended solids remaining in the liquid after the gross solids separation step performed for example by a coiled spring conveyor separator, and second it adds coagulating ions to the remaining liquid by corrosion of the aluminum powder. These aluminum ions precipitate and coagulate any suspended material and some of the dissolved material remaining in the liquid. After passing through this first column, the liquid goes to a stripper column. The stripper operation is based on the principle of electrophoretic coalescence. The stripper column may be filled with a mixture of aluminum powder and granular carbon which react to form a galvanic cell and attract the ions remaining in solution. The third column is filled with activated carbon. Activated carbon has the capability of removing high amounts of COD and BOD by absorption, as is known in the art. In other applications, all the columns may operate on the principle of electrophoretic coalescence.

A positive displacement pump may be utilized to move the sewage or waste in variable amounts to the filtration columns. By way of example, the pump may generally be programmed to convey the fluid at 3.5 gal. per minute. However, when the surge tank is filled one-half to three-fourths its capacity, the pumping capacity will increase to 7.5 gal. per minute, and when the tank contains greater than three-fourths of its capacity, the pump is programmed to 10 gal. per minute, and the columns are so sized as to efficiently separate solid under maximum flow conditions.

DESCRIPTION OF THE DRAWINGS

For a better understanding of the invention reference may be had to the accompanying illustrative drawings, in which.

DESCRIPTION OF THE PREFERRED EMBODIMENT

Figure 1:
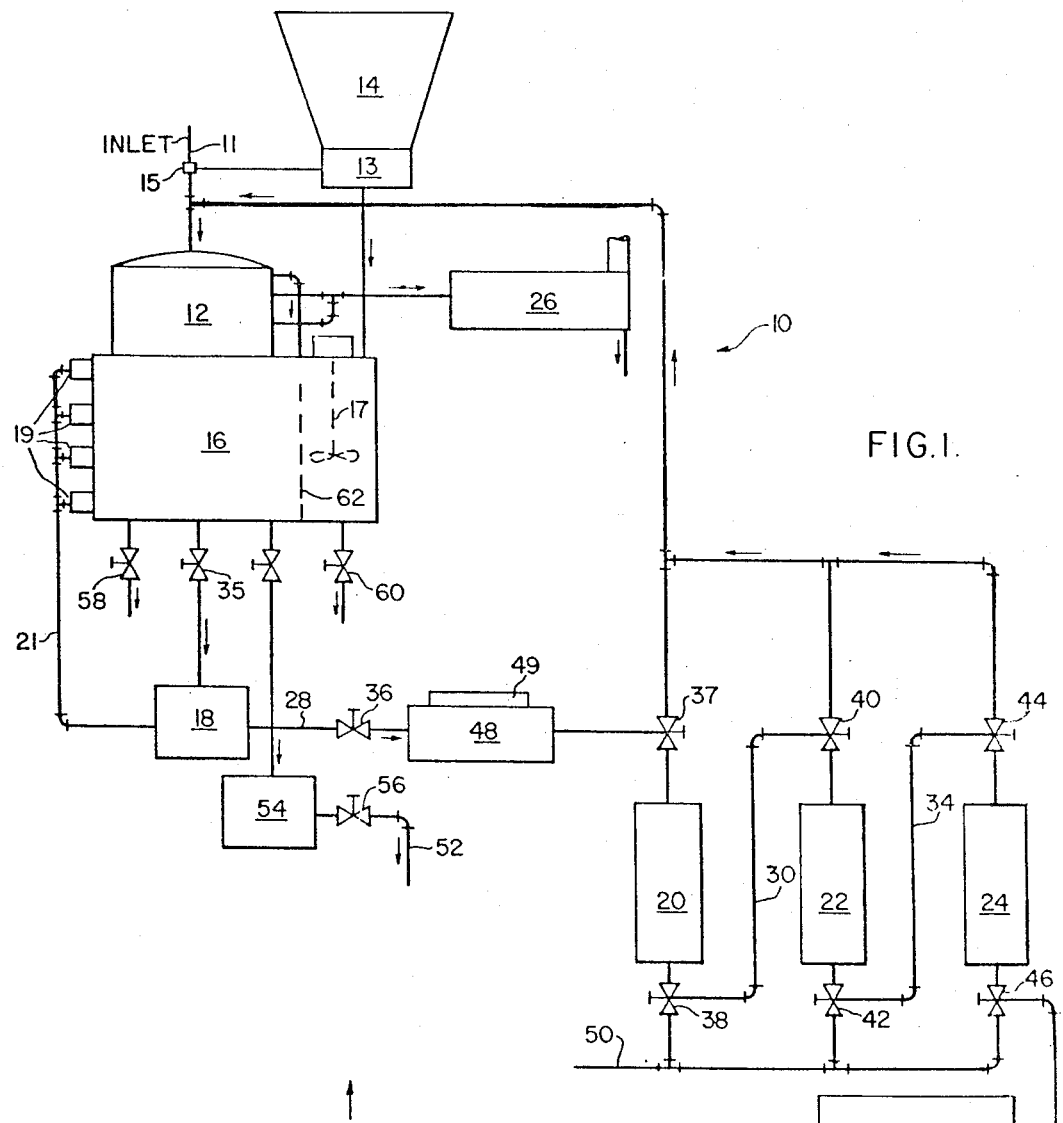
FIG. 1 shows a flow diagram of a waste treatment system in accordance with this invention.

Referring to FIG. 1, there is shown a device 10 which utilizes the concepts of screening, chemical conditioning and filtration-adsorption to treat waste. The system is also highly efficient in treating water including colloidal particles. The device 10 essentially consists of a solid separation means 12 which will remove at least 50 percent of the contaminants from the waste, a chemical feed system 14 which will feed conditioning-disinfecting chemicals to the screened liquid, a surge-conditioning tank 16, a variable volume feed pump 18, and a filtration-absorption system comprising three columns 20, 22 and 24, and an incinerator to dispose of the solids removed from the system; which incinerator is generally designated by the numeral 26.

Raw waste or water is fed from an inlet line 11 onto a conveyor belt type solid separation device 12. The solid separation device 12 consists of a conveyor belt composed of tightly coiled stainless steel springs. Any unpulped paper and fecal matter which may be present are conveyed by the belt to the incinerator 26 while the liquid passes between the coils of the springs which compose the belt. Cleaning discs are located at both ends of the belt to remove objects such as paper towels which might adhere to the springs by surface tension. Other particles which might become attached to the coils of the springs are washed out by the flow of water from above while the springs on the bottom portion of their travel cycle.

The coiled spring, solids separation device is of a well known design in the art and is not described in detail for this reason, but rather forms a part of the broad novel combination of this invention.

The solid matter is conveyed as previously indicated to an incinerator 26. The remaining liquid and small particulate matter then flow by gravity feed into the surge-conditioning tank 16.

Tankage to contain greater than average flows is by far the largest volume item in a treatment plant of the average design flow rate, for example, 3.5 gal. per minute. The system should be capable of absorbing up to 300 percent of average flow, or 10.5 gal. per minute. The maximum flow condition would then require a tank 16 of 300 gal. capacity. It is a feature of this invention that the surge-conditioning tank 16 is designed for the minimum volume flow of, for example, 3.5 gal. per minute. The feed pump 18 and filter-absorption units 20, 22 and 24, to be described, are sized to treat the increased flow rather than storing it for later treatment.

Figure 2:
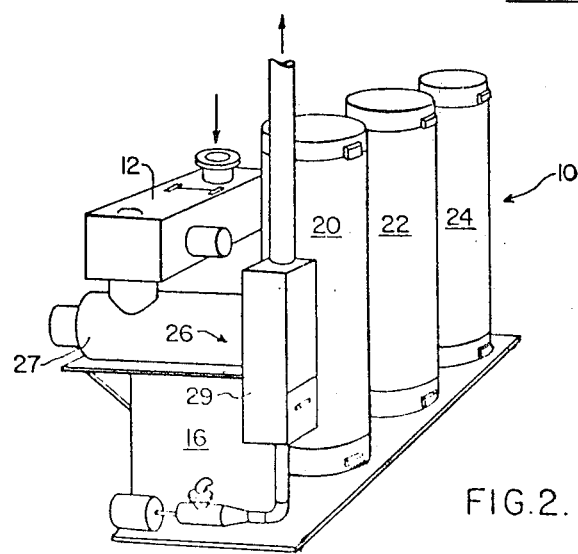
FIG. 2 shows an isometric view of the system indicating the compact manner in which it can be constructed.

As shown in FIG. 2, the surge conditioning tank comprises the core of the system and is used as a structural unit. Conditioning and disinfecting chemicals are added to the tank 16 and the tank 16 contains mixers 17 to assure sufficient contact of chemicals and screened sewage. The materials used for constructing this tank should be such as to resist corrosion from either sea water, sewage or chemicals added to condition the sewage.

A chemical feeder 14 feeds dry chemicals in small, closely controlled amounts in proportion to the amount of flow through the system. In order to control the flow of chemicals to the surge tank 16, a liquid sensor 15, such as a heated thermistor, is placed in the inlet line 11. When the sensor 15 is cooled by the presence of liquid, it actuates a timer on the motor 17. The motor 17 may then rotate a brush or the like for a predetermined time period to allow the chemical particles to fall by gravity into the tank 16. A rotating wire brush has been found to act as an effective valve for feeding chemical particles. The use of a dry chemical feeder obviates the requirement for mixing solutions and the use of chemical metering pumps. The chemicals used should be both of a coagulating nature and of a disinfecting nature. By way of example, a mixture of 75 percent alum and 25 percent calcium hypochlorite has been found to materially aid in the production of a high quality effluent.

A positive displacement pump 18 with a variable speed drive is used to convey the conditioned sewage or treated water from the surge tank 16 to the filtration-absorption columns 20, 22 and 24. When the surge conditioning tank 16 is less than one-half filled with liquid, the feed pump 18 is programmed to pump at the rate of, for example, 3.5 gal. per minute. This is expected to be the operational mode 90 percent of the time. When the surge tank 16 is filled from one-half to three-fourths of its capacity, the pump will operate, for example, at a rate of 7.5 gal. per minute. When the tank contains a volume of liquid greater than three-fourths of its capacity the pump will be programmed to pump, for example, 10 gal. per minute. The capacity of the pump 18 can be changed by altering the speed of the motor driving the pump. A plurality of level sensors 19 in the tank will signal speed controlling devices to program the pumping speed via electrical cables 21. As indicated, such a programmed pump operation enables the surge tank to be sized for minimum volume and accordingly, enables the system to be of minimum, overall size.

The liquid medium containing particulate matter is first pumped via conduit 28 to column 20. Each of the columns 20, 22 and 24 may contain a separate media performing a multiplicity of functions. In one preferred embodiment, column 20 contains a media consisting of 20 to 50 mesh aluminum powder. This filter media performs a dual function. First, it removes conditioned suspended solids remaining in the liquid after the gross solids separation step performed by the separator 12, and second, it adds coagulating ions to the remaining liquid by corrosion of the aluminum powder. These aluminum ions precipitate and coagulate any suspended material and some of the dissolved material remaining in the liquid.

After passing through the filter coagulator column 20, the liquid is conveyed by means of conduits 30 to the second column 22. This column performs a stripping operation. The stripping operation is based upon the principle of electrophoretic coalescence. The remaining colloidal particles in the liquid are anionic, cationic and neutral. To remove these particles of unlike charges, the stripper contains a media that is a mixture of bimetallic particles.

When a filter media is composed of granules of material that have different electrode potentials, an emf is developed between the granules when a conducting liquid such as raw water or sewage flows through the filter. The emf developed will depend upon the electrode potentials of the materials used.

The materials suspended in raw water and sewage after the primary treatment are colloidal. Colloidal particles with their large surfaces are likely to have ions attached to them. An ion induces a charge of opposite sign in an adjacent molecule and will thus be held to the surface of the ion-induced dipole attraction. According to the simplest view, all adsorb particles in a given colloidal solution tend to absorb an excess of either positive or negative ions and thus require a charge. The particles thus repel each other and tend to prevent combination and precipitation of colloidal material.

The situation is more complicated, however, because the charged surface of the colloidal particles tend to attract ions of opposite sign to it forming two layers of oppositely charged electricity as in a condenser. These electrical fields due to ions constitute what is known as a double layer. The layer of charges adhering to the solid surfaces move with reference to the main body of liquid. Thus the double layer stretches much further out than a molecular distance from the solid surface into the liquid and it is diffuse rather than compact. The total potential drop is between the surface of the solid and the movable liquid but the electro-kinetic or zeta potential is that portion of the total drop between the liquid adhering to the wall of the particle and the movable liquid. The zeta potential is determined by all the ions which happen to be present in the boundary layer and their charge and absorbability determine the effect produced.

There are several important consequences of the existence of electropotential differences in the diffuse double layer. The application of external voltage causes the charged colloidal particles to move toward one of the electrodes. The motion is one of a fixed layer of liquid relative to a movable layer. The negative colloid moves to the positive electrode and a positive colloid to a negative electrode. This phenomenon is known as electrophoresis and forms the basis of the action of the stripper column.

Therefore, a filter media composed of granules which are in essence electrodes in a galvanic cell will exert forces of an electrical nature on the charged colloidal and ionic material passing through the filter and cause the contaminates to migrate to one of the electrodes, or in other words, migrate to a granule of filter media with an opposite electrical charge.

The bimetallic materials may be chosen on the basis of their electrode potentials and their relative cost. Any material of a sizable negative electrode potential may be teamed with any material with a sizable positive electrode potential to form a filter in accordance with this invention. The preferred embodiment on the basis of electrode potential and cost is aluminum powder and granular carbon. The table set forth below indicates the percentage of aluminum and carbon which have been tested and their ability to remove turbidity, remove suspended solids and reduce chemical oxygen demand. As can be seen from this table, a mixture of 40 percent aluminum powder and 60 percent carbon granules is particularly effective.

TABLE II.—Filtration of screened sewage through bimetallic media

| Percent Al by volume | Percent by volume | Sus. solids Mg/l | COD Mg/l | pH | Cond $\mu$ mhos | Turbidity JTU | Density Lb/ft³ |
|---|---|---|---|---|---|---|---|
| 0 | 0 (feed) | 375 | 680 | 8.4 | 769 | >1000 | — |
| 0 | 100 | 145 | 316 | 8.4 | 636 | 330 | 37.2 |
| 10 | 90 | 79 | 120 | 8.3 | 611 | 23 | 40.2 |
| 20 | 80 | 97 | 148 | 8.4 | 592 | 25 | 42.2 |
| 30 | 70 | 82 | 136 | 8.3 | 588 | 21 | 45.2 |
| 40 | 60 | 21 | 24 | 8.1 | 489 | 2 | 49.6 |
| 50 | 50 | 25 | 28 | 8.2 | 592 | 2 | 51.6 |
| 60 | 40 | 39 | 44 | 8.8 | 587 | 5 | — |
| 70 | 30 | 41 | 76 | 9.0 | 612 | 8 | — |
| 80 | 20 | 46 | 92 | 9.0 | 636 | 17 | — |
| 90 | 10 | | | | | | |
| 90 | 10 | 58 | 136 | 9.0 | 659 | 25 | — |
| 100 | 0 | 74 | 244 | 9.0 | 681 | 54 | 65 |

A bimetallic media filter may also be used for all three columns shown to up the filtration-absorption system of the embodiment disclosed. The percentages of aluminum and carbon may also be varied throughout the three to take advantage cost reductions which may be effective in utilizing a lesser percentage of aluminum as for example, utilizing percent aluminum and 90 percent carbon in the first two columns for gross separation and the 40 –60 percent for polishing. If desired, after passing through column 22, the media, conveyed via conduit 34 to the third in the series of columns, column 24. This third column, an adsorption column, may be filled with activated carbon. Activated carbon has the ability to remove up to one-half lb. of per pound of carbon in the system.

The non-biological waste treatment system has two basic operating modes, namely, run and backwash. During the run mode of operation the feed pump 18 is energized and the proper on-off valves designated by the numeral 35, 36 and three way valves 37, 38, 40, 42, 44 and 46, are actuated to permit the liquid stored in the surge-conditioning tank 16 to pass through the three filter-adsorber units 20, 22 and 24 to a drain. The backwash mode consists of three operating cycles that permit backwash of each filter-adsorber unit separately. The duration of each of the backwash cycles may be adjusted. Thus, when the system is placed in the backwash mode of operation, the backwash valves of each filter-adsorber unit are sequentially actuated for a preset interval. The system may be automatically programmed to transfer between the two operating modes depending upon the intelligence received from a pressure sensor 48 located on conduit 28.

The pressure sensor 48 measures the pressure exerted by pump 18 in forcing the liquid medium containing particulate matter through the columns 20, 22 and 24. This pressure increases with the amount of particulate matter retained in the columns and primarily column 20, as is known in the art. When this pressure reaches a predetermined level a timer 49 is started which sequentially and separately backwashes the three columns 20, 22 and 24 and then switches back to the run mode.

Backwashing proceeds with the backwash water being drawn from the drain system through to make conduit 50. Column 20 is backwashed by opening actuating valves 37 and 38, as can be seen in FIG. 1. Any columns to matter in of cost backwash water is sent to the coil spring separator 12 and then to the incinerator 26. Then 10 valves 42 and 40 may be actuated to backwash column 22 and in like manner, valves 46 and 44 40–to backwash column 24. media is of COD For sewage applications, it is contemplated that approximately 50 percent of the particulate matter in the sanitary system will be removed by the separator 12 and that this particulate matter can be incinerated. The remaining particulate matter removed by the columns 20, 22 and 24 is recycled through the separator 12 to the incinerator 26 so that essentially all the particulate matter in the waste water is eventually incinerated. The electric incinerator 26 is used for this purpose. As indicated, the solids removed by the solids separating device 12, both those in the raw waste water and in the backwash water, are deposited directly in the incinerator 26 thereby eliminating any transport problem. The particles are first moved through the heated barrel of the incinerator designated in FIG. 2 by the numeral 27. The temperature profile of this barrel 27 is controlled by band heaters clamped to the outside of the barrel. A temperature of 800°F is reached by the solids before exit from the barrel into the incinerator portion designated by the numeral 29. An after-burner embedded in a radiant ceramic plate then heats the exhaust gases in the incinerator portion 29 to about 1,500°F to ensure combustion of all smoke and odoriferous material. Any foreign noncombustible items that pass through the solids separation device and pass through the incinerator will be deposited in the usual ash box beneath the incinerator.

The system also includes a bypass line 52 having a pump 54 and an on-off valve 56 therein. This bypass system may be utilized to pump waste from the system should an overflow condition occur. The system may also include sampling parts 58 and 60 with a baffle 62 separating the tank 16 into two interconnected chambers so as to enable the operator to periodically check the conditioning efficiency with the surge tank 16.

In view of the above, it will be apparent that many modifications and variations are possible in light of the above teachings. It therefore is to be understood that within the scope of the appended claims, the invention may be practiced other than as specifically described.

I claim as my invention:

1. A device for separating solid particles from a liquid medium in which same are suspended comprising:
   a container having conduits affixed thereto through which a liquid medium containing particulate matter can enter and exit therefrom;
   said container including a mixture of electrically conductive granules which develop an emf between the granules when said liquid medium flows through the container, one type granule being chosen from the class of materials having a positive electrode potential, and another type being chosen from the class of materials having a negative electrode potential; and
   said granules being capable of exerting an electrical force on said particulate matter to cause the matter to migrate to granules having opposite electrical charges and thereby electrophoretically remove the matter from said liquid.

2. The device of claim 1 wherein said one type granule is electrically conductive metallic aluminum powder and the other is electrically conductive carbon granules.

3. The device of claim 2 wherein said granules are in the ratio of 40 percent aluminum powder and 60 percent carbon.

* * * * *